Sept. 18, 1956 H. J. FORTUNE 2,763,487

STOP MEANS FOR RECORD CHANGERS

Filed Dec. 7, 1950 2 Sheets-Sheet 1

INVENTOR
Henry James Fortune
by David J. Mosent
his atty

Sept. 18, 1956 H. J. FORTUNE 2,763,487

STOP MEANS FOR RECORD CHANGERS

Filed Dec. 7, 1950

2 Sheets-Sheet 2

INVENTOR

Henry James Fortune by his Atty

United States Patent Office 2,763,487

Patented Sept. 18, 1956

2,763,487

STOP MEANS FOR RECORD CHANGERS

Henry James Fortune, Swindon, England, assignor to The Garrard Engineering and Manufacturing Company, Limited, Swindon, England Application December 7, 1950, Serial No. 199,640

4 Claims. (Cl. 274—10)

This invention relates to record changing phonographs of the type having a rotary control device for controlling the raising of the pickup, the swinging of the pickup clear of the records on the turntable, releasing a new record from a stack, returning the pickup to the playing position and lowering it onto the fresh record.

In such record changes when the stack of records is exhausted and the last record is playing knockout means actuated by the control device are adapted to operate to switch off the motor.

With present day records having very shallow grooves it is necessary to employ a pickup arm having a very light pressure on the stylus and with modern pickups incorporating crystal there is a danger of damaging the pickup should it be swung in and lowered in the absence of any records in the stack or on the turntable, and it is the object of the invention to provide improved knockout means by which the pickup arm is prevented from being swung in when the records have been played and removed.

According to the invention a knock out member is mounted to swing on a vertical axis under control of the rotary control element so that a part of the member engages the records on the stack, the arrangement being such that when the stack is exhausted the member has a greater movement whereby stop means are brought into operation to prevent the return of the swing lever whereby the pickup arm is prevented from swinging in.

The stop means may comprise a hook device which is moved into the path of a pin on the swingout lever, the hook being subsequently moved to a release position by means under the control of the rotary control element at the end of its cycle.

Figure 1:
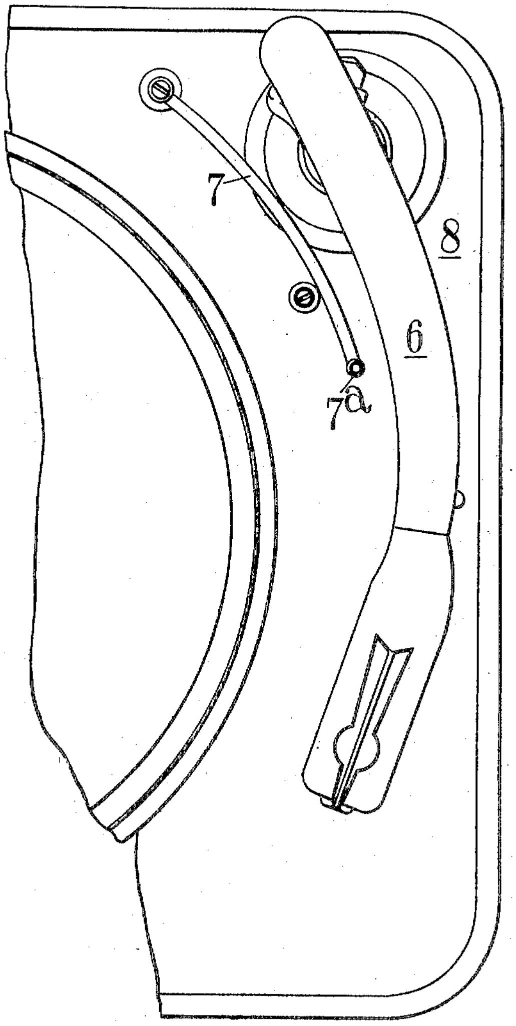
Figure 1 is a partial plan of a record changer showing the knockout arm.
Figures 2, 3:
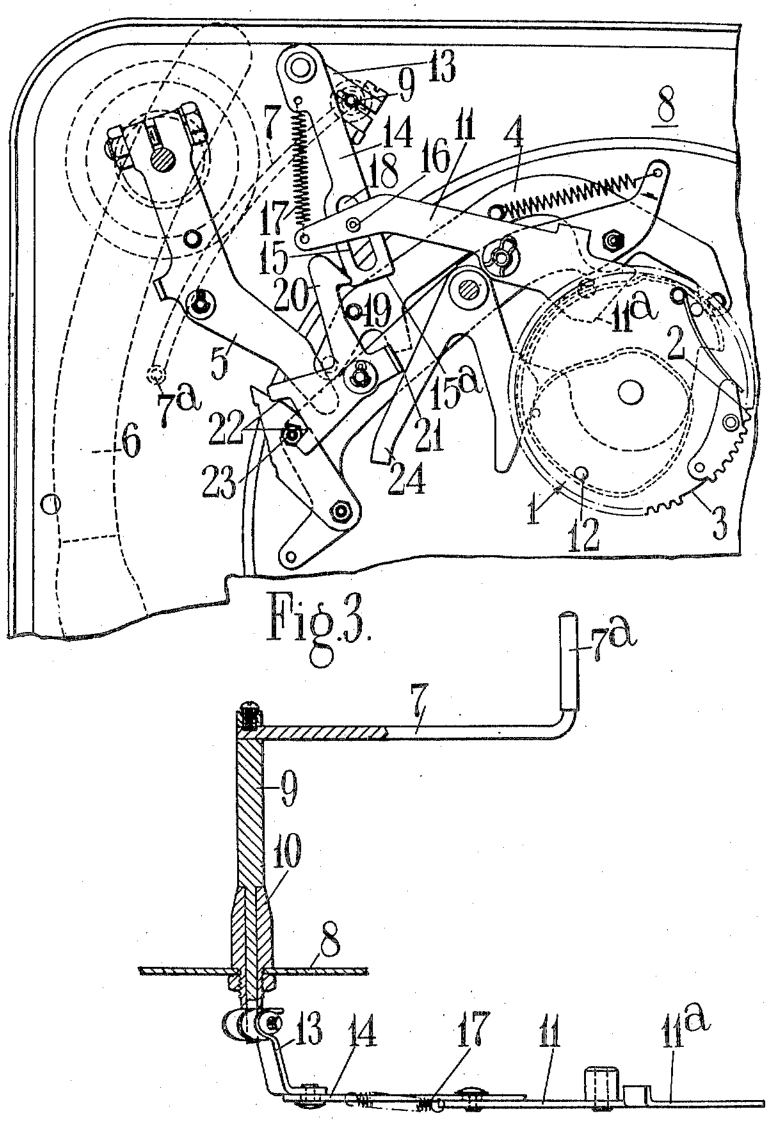
Figure 2 is an elevation partly in section showing the knockout arm and its operating mechanism.
Figure 3 is an inverted plan of a record changer showing only those parts associated with the knockout arm.

In carrying the invention into effect according to one convenient mode, the rotary control element 1 is of the kind described in the patent specifications Serial Nos. 714,271, now U. S. Patent No. 2,640,705, and 771,000, now U. S. Patent No. 2,650,831, and comprises an interrupted gear wheel 2 the gap 3 of which, during the playing of a record, faces a driving pinion associated with the turntable.

The rotary control element 1 is provided with cam surfaces controlling the movement of various means including a swing lever 4 adapted to engage a pickup lever 5 coupled to the pickup arm 6.

The knockout arm 7 is mounted above the motor board 8 and has a part 7a adapted to engage the records in the stack when the arm is swung about a vertical axis.

The knockout arm 7 is secured to a spindle 9 mounted for rotation in a bearing element 10 secured to the motor board.

The swinging of the knockout arm 7 is effected by a pivoted knockout lever 11 which is provided with a cam surface 11a adapted to be engaged by a pin or projection 12 on the rotary control element 1. The connection between the knockout lever 11 and knockout arm 7 is such as to permit lost motion when the arm engages the records in the stack. For this purpose the spindle 9 of the knockout arm 7 has an arm or lever 13 secured to the lower end thereof and such arm or lever has a link 14 pivoted thereto. The link has a slotted end 15 in which a pin 16 carried by the knockout lever 11 engages. A spring 17 secured to the end of the knockout lever 11 and the link 14 holds the pin 16 normally to the inner end of the slot 18.

The swing lever 4 adjacent its end which engages the pickup lever 5 is provided with a pin 19 which is adapted under certain conditions to be engaged by a hook device 20 to prevent the lever 4 returning and the pickup moving inwardly.

The hook 20 is pivotally mounted on a plate and is frictionally held in position thereon by a spring. The hook has a surface or projection 21 adapted to be engaged by the end surface 15a of the slotted link 14 to move the hook 20 to a position to be engaged by the pin 19 on the swing lever 4.

The hook member 20 is provided with surfaces 22 adapted to engage a stop 23 at the ends of the hook movements.

The surface or projection 21 on the hook also lies in the path of a pivoted return lever 24 which is actuated by a cam on the rotary control device 1 at the end of the cycle of movement.

When there are records in the stack the knockout arm 7 has a short swing as it engages the stack and therefore there is no engagement of the surface 21 of the hook 20 by the slotted link 14 and consequently the swing lever 4 has a return movement permitting the pickup to swing in.

When there are no records in the stack the knockout arm 7 has an extended movement so that the slotted surface 15a of the link 14 engages the surface 21 and pivots the hook 20 to a position in which the pin 19 on the swing lever 4 is engaged so that the return movement of such lever is prevented, the lever thus forming a stop which prevents the pickup arm swinging in.

As the rotary control device 1 finishes its cycle the hook resetting lever 24 is actuated and the hook 20 returned to its inoperative position so that on a fresh stack of records being mounted in position the swing lever 4 will return and permit the pickup arm swinging in.

I claim:

1. In an automatic record changing phonograph arranged to play a series of stacked records successively discharged from the stack onto a turntable and including an oscillatably mounted pickup arm movable across a record on the turntable from a rest position outside the peripheral margin of the turntable toward the turntable axis under the guidance of the record groove during playing of the record, a record changing cycle control member selectively operable by the turntable, a lever controlled by said member for movement between a first position restraining movement of the pickup arm toward the turntable axis and a second position providing for such pickup arm movement, a pickup lever coupled with said pickup arm for movement therewith in a plane parallel to the turntable, a swing arm operatively associated with said pickup lever and operable by said control member, at the end of a record changing cycle, from a first position blocking movement of the pickup arm toward the turntable axis to a second position providing for such movement of the pickup arm, and a pivoted return lever operable by said control member at the end of the record changing cycle; a knockout arm oscillatable about an axis for movement, parallel to that of said pickup arm, toward the turntable axis and positioned to have its movement toward the turntable axis interrupted by engagement with the peripheral margin of a record in such stack; a knockout link coupled with said knockout arm for movement therewith in a plane parallel to the turntable; a latch element carried by said swing arm; a locking member oscillatably mounted for movement in a plane parallel to the turntable to and from a position in the path of said latch element and blocking movement of said swing arm to said second locking position of the latter; said knockout link engaging said locking member and moving the same into the path of said element upon movement of said knockout arm inwardly of the peripheral margin of a record in the stack; and a knockout lever operable by said control member, in advance of operation of said swing lever thereby, to bias said knockout link to operate said locking member, said knockout lever having a lost-motion connection to said knockout link effective when said knockout arm engages the peripheral margin of a record in such stack to prevent engagement of said locking member by said knockout link; said return lever moving said locking member away from said locking position and out of the path of said link element as said control member finishes a record changing cycle.

2. A record changing phonograph as claimed in claim 1, wherein the locking member comprises a hook at one end movable into the path of a pin on the swing arm by a camming member on the knockout lever operative upon said greater movement of the knockout arm against the other end of said locking member.

3. A record changing phonograph as claimed in claim 1, wherein the knockout lever is operated by a pin in the rotary control device, the knockout lever having a cam surface adapted when the knockout arm partakes of said greater movement, to engage one end of the locking member and move it to its interlocking position with the swing arm.

4. A record changing phonograph as claimed in claim 1 wherein the locking member has a surface adapted to be engaged by the pivoted return lever as the rotary control device finishes its cycle whereby the locking member is returned to its inoperative position.

References Cited in the file of this patent

UNITED STATES PATENTS

| | | |
|---|---|---|
| 2,309,197 | Lewis | Jan. 26, 1943 |
| 2,333,414 | De Tar | Nov. 2, 1943 |
| 2,378,086 | Johnson | June 12, 1945 |
| 2,545,643 | Bender | Mar. 20, 1951 |
| 2,616,708 | Vivie | Nov. 4, 1952 |

FOREIGN PATENTS

| | | |
|---|---|---|
| 404,666 | Great Britain | Jan. 15, 1934 |
| 549,635 | Great Britain | Dec. 1, 1942 |
| 606,458 | Great Britain | Aug. 13, 1948 |